US012240110B2

(12) United States Patent
Uchikata et al.

(10) Patent No.: US 12,240,110 B2
(45) Date of Patent: Mar. 4, 2025

(54) WELDING SYSTEM, WELDING ROBOT CONTROL PROGRAM CREATION DEVICE, AND WELDING ROBOT CONTROL PROGRAM CREATION METHOD

(71) Applicant: Panasonic Intellectual Property Management Co., Ltd., Osaka (JP)

(72) Inventors: Akimasa Uchikata, Osaka (JP); Yoshiyuki Okazaki, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 197 days.

(21) Appl. No.: 18/070,990

(22) Filed: Nov. 29, 2022

(65) Prior Publication Data
US 2023/0088582 A1 Mar. 23, 2023

Related U.S. Application Data

(63) Continuation of application No. PCT/JP2021/019024, filed on May 19, 2021.

(30) Foreign Application Priority Data

Jun. 10, 2020 (JP) ................. 2020-101188

(51) Int. Cl.
B25J 9/00 (2006.01)
B23K 37/02 (2006.01)
(Continued)

(52) U.S. Cl.
CPC ......... B25J 9/0081 (2013.01); B23K 37/0229 (2013.01); B25J 9/1664 (2013.01); G05B 19/4155 (2013.01); G05B 2219/40269 (2013.01)

(58) Field of Classification Search
CPC ... B25J 9/0081; B25J 9/1664; B23K 37/0229; G05B 19/4155; G05B 2219/40269; G05B 2219/45104; G05B 2219/45135
See application file for complete search history.

(56) References Cited

U.S. PATENT DOCUMENTS 4,642,447 A * 2/1987 Detriche ............. G05B 19/425
901/42
4,965,499 A * 10/1990 Taft ...................... G05B 19/425
318/568.15
(Continued)

FOREIGN PATENT DOCUMENTS

CN 110039523 7/2019
JP 2012-024867 2/2012
(Continued)

OTHER PUBLICATIONS

Extended European Search Report issued Nov. 6, 2023 in corresponding European Patent Application No. 21822694.2.
(Continued)

Primary Examiner — Jason Holloway
Assistant Examiner — Madison B Emmett
(74) Attorney, Agent, or Firm — Wenderoth, Lind & Ponack, L.L.P.

(57) ABSTRACT

A welding system includes a welding robot provided with a torch, and a welding robot control program creation device. The welding robot control program creation device is configured to acquire position information of a welding start point and a welding end point on a workpiece, and posture information capable of specifying a posture of the torch with respect to a weld line at a welding teaching point on the weld line connecting the welding start point and the welding end point, and create a welding robot control program for performing welding from the welding start point to the welding end point based on the position information and the
(Continued)

posture information. The welding robot is configured to perform welding on the workpiece based on the welding robot control program.

9 Claims, 15 Drawing Sheets

(51) Int. Cl.
    *B25J 9/16*     (2006.01)
    *G05B 19/4155*     (2006.01)

(56) References Cited

U.S. PATENT DOCUMENTS

| | | | |
|---|---|---|---|
| 6,313,427 B1* | 11/2001 | Suita | B23K 11/10 219/109 |
| RE40,212 E* | 4/2008 | Watanabe | B23K 9/32 700/262 |
| 2010/0312391 A1 | 12/2010 | Choi et al. | |
| 2015/0094855 A1* | 4/2015 | Chemouny | G05B 19/423 901/3 |
| 2018/0126556 A1* | 5/2018 | Perrot | B25J 9/1679 |
| 2019/0077016 A1* | 3/2019 | Atohira | G05B 19/182 |
| 2019/0086907 A1* | 3/2019 | Oestergaard | B25J 9/1615 |
| 2020/0130095 A1 | 4/2020 | Baba | |
| 2020/0368904 A1* | 11/2020 | Aldridge | B23K 9/0953 |
| 2020/0384563 A1* | 12/2020 | Jo | B23K 37/0294 |
| 2024/0001473 A1* | 1/2024 | Motokado | B23K 9/0953 |
| 2024/0123534 A1* | 4/2024 | Akey | B23K 9/0953 |
| 2024/0399513 A1* | 12/2024 | Tozer | B23K 9/028 |

FOREIGN PATENT DOCUMENTS

| | | |
|---|---|---|
| JP | 2014-097517 | 5/2014 |
| JP | 2018-176255 | 11/2018 |
| WO | 2011/039542 | 4/2011 |
| WO | 2019/135835 | 7/2019 |

OTHER PUBLICATIONS

International Search Report issued Jul. 20, 2021, in International (PCT) Application No. PCT/JP2021/019024, with English translation.

* cited by examiner

WELDING SYSTEM, WELDING ROBOT CONTROL PROGRAM CREATION DEVICE, AND WELDING ROBOT CONTROL PROGRAM CREATION METHOD

CROSS-REFERENCE TO RELATED APPLICATIONS

This is a continuation of International Application No. PCT/JP2021/019024 filed on May 19, 2021, and claims priority from Japanese Patent Application No. 2020-101188 filed on Jun. 10, 2020, the entire content of which is incorporated herein by reference.

TECHNICAL FIELD

The present disclosure relates to a welding system, a welding robot control program creation device, a welding robot control program creation method, and a creation program for a welding robot control program.

BACKGROUND ART

PTL 1 describes a teaching device for a spot welding robot. The teaching device includes a relative position input reception unit for receiving an input of relative position information, a welding point input reception unit, an air-cut point determination unit, and an operation program generation unit. The relative position information includes distance information indicating how far a welding tip positioned at a front end of a welding gun provided in a spot welding robot is separated from a workpiece in relation to a position of a welding point on the workpiece to be welded by the spot welding robot. The relative position information includes first movement information indicating how much the welding gun is moved to a side where the welding point is located with respect to the workpiece, and second movement information indicating how much the welding gun is moved to a side where the welding point is not located with respect to the workpiece. The welding point input reception unit receives, for each of a plurality of welding points, an input of welding point information including a position and a welding order of the welding points on the workpiece and a welding operation related to the welding point. The air-cut point determination unit determines an air-cut point of the welding gun related to the welding operation whose input is received by the welding point input reception unit, based on the relative position information whose input is received by the relative position input reception unit and the welding point information whose input is received by the welding point input reception unit. The operation program generation unit generates an operation program for the spot welding robot to perform the welding operation while maintaining a posture of the welding gun, based on the air-cut point determined by the air-cut point determination unit.

CITATION LIST

Patent Literature

[PTL 1] JP2012-024867A

SUMMARY OF INVENTION

Technical Problem

An object of the present disclosure is to provide a welding system, a welding robot control program creation device, a welding robot control program creation method, and a creation program for a welding robot control program, which are capable of performing welding from a welding start point to a welding end point along a weld line by an easy-to-operate teaching.

Solution to Problem

The present disclosure provides a welding system including a welding robot provided with a torch and a welding robot control program creation device. The welding robot control program creation device acquires position information of a welding start point and a welding end point of welding performed on a workpiece, and posture information capable of specifying a posture of the torch with respect to a weld line at a welding teaching point on the weld line connecting the welding start point and the welding end point, and creates a welding robot control program for performing welding from the welding start point to the welding end point based on the position information and the posture information. The welding robot performs welding on the workpiece based on the welding robot control program.

In addition, the present disclosure provides a welding robot control program creation device including a processing unit, in which the processing unit acquires position information of a welding start point and a welding end point of welding performed on a workpiece, and posture information capable of specifying a posture of a torch included in a welding robot with respect to a weld line at a welding teaching point on the weld line connecting the welding start point and the welding end point, and creates a welding robot control program for performing welding from the welding start point to the welding end point based on the position information and the posture information.

In addition, the present disclosure provides a welding robot control program creation method by a welding robot control program creation device, the welding robot control program creation method including: acquiring position information of a welding start point and a welding end point of welding performed on a workpiece, and posture information capable of specifying a posture of a torch included in a welding robot with respect to a weld line at a welding teaching point on the weld line connecting the welding start point and the welding end point, and creating a control program of the welding robot for performing welding from the welding start point to the welding end point based on the position information and the posture information.

Further, the present disclosure provides a creation program for a welding robot control program causing a welding robot control program creation device to acquire position information of a welding start point and a welding end point of welding performed on a workpiece, and posture information capable of specifying a posture of a torch included in a welding robot with respect to a weld line at a welding teaching point on the weld line connecting the welding start point and the welding end point, and create a control program of the welding robot for performing welding from the welding start point to the welding end point based on the position information and the posture information.

Advantageous Effects of Invention

According to the present disclosure, it is possible to provide a welding system, a welding robot control program creation device, a welding robot control program creation method, and a program for creating a welding robot control program, which are capable of performing welding from a welding start point to a welding end point along a weld line by an easy-to-operate teaching.

DESCRIPTION OF EMBODIMENTS

Background of Present Disclosure

A robot device provided with a torch that performs welding on a workpiece is known. PTL 1 describes a teaching device and a teaching method for a spot welding robot. PTL 1 describes a technique in which a real space is projected onto a virtual space of a computer, a virtual robot model corresponding to a spot welding robot in the real space is created in the virtual space, and an operation of the spot welding robot is programmed using the virtual robot model.

The welding performed in PTL 1 is spot welding of point joining, and the technique described in PTL 1 cannot perform welding from a welding start point to a welding end point along a weld line. In addition, in PTL 1, an operation unit for inputting an instruction of a user to the teaching device is an input device such as a keyboard or a mouse. When an input device such as a keyboard or a mouse is used, it is difficult for an operator to perform instruction input that intuitively simulates a movement of the torch of the welding robot.

Therefore, in the following embodiments, a welding system, a welding robot control program creation device, a welding robot control program creation method, and a creation program for a welding robot control program, which are capable of performing welding from a welding start point to a welding end point along a weld line by an easy-to-operate teaching, will be described in detail.

Hereinafter, an embodiment (hereinafter, referred to as "the present embodiment") specifically disclosing a welding system, a welding robot control program creation device, a welding robot control program creation method, and a creation program for a welding robot control program according to the present disclosure will be described in detail with reference to the drawings as appropriate. However, an unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for a thorough understanding of the present disclosure for those skilled in the art, and are not intended to limit the subject matter in the claims.

Overview of Welding Robot System 100

Figure 1:
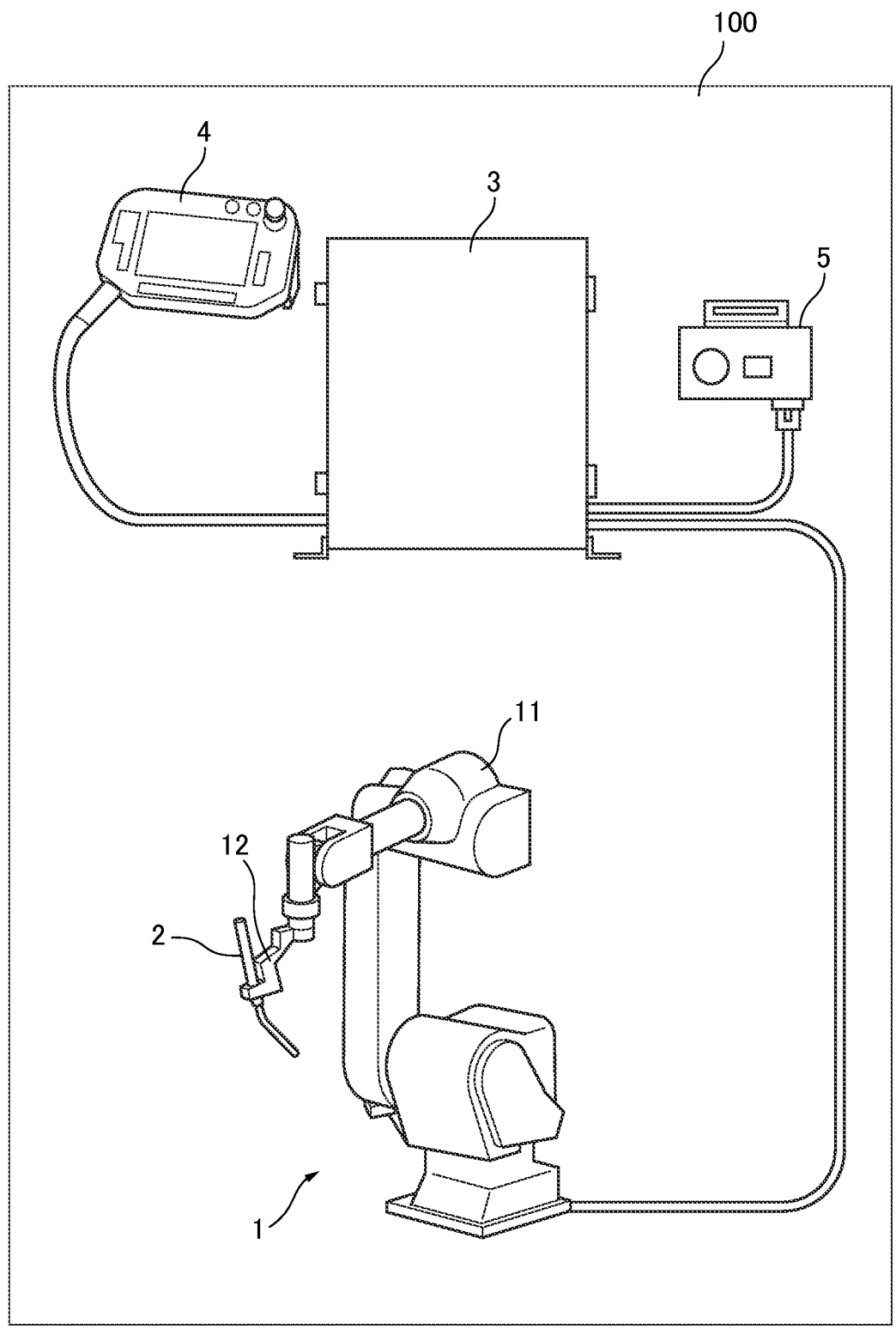
FIG. 1 is a conceptual diagram illustrating an example of a welding robot system.

FIG. 1 is a conceptual diagram illustrating an example of a welding robot system 100. The welding robot system 100 includes a welding robot 1, a torch 2 included in the welding robot 1, and a robot controller 3. The welding robot system 100 may further include a teach pendant 4. The welding robot system 100 may further include an operation box 5.

The welding robot 1 is a robot that performs welding on a workpiece. The welding robot 1 may include an articulated robot arm 11. An end effector 12 is connected to a front end portion of the robot arm 11. The end effector 12 is typically a robot hand having one or more fingers, but may be an end effector having no finger.

An image capturing unit such as a camera may be provided on the robot arm 11, in the vicinity of a connection portion between the robot arm 11 and the end effector 12, or the like. A three-dimensional movement of the robot arm 11 is controlled by the robot controller 3 connected to the robot arm 11. Movements of the robot arm 11 and the end effector 12 may be controlled based on an image captured by the image capturing unit such as a camera.

For example, in welding such as arc welding, the torch 2 is used when welding is performed on a workpiece. The type of welding such as gas welding or laser welding and the type of a torch corresponding to the type of welding are not limited here.

The robot controller 3 is connected to the welding robot 1 and controls a behavior of the welding robot 1. The robot controller 3 may control the behavior of the welding robot 1 by the operator operating the teach pendant 4. The robot controller 3 may control the behavior of the welding robot 1 by the operator operating the operation box 5. The robot controller 3 may control the behavior of the welding robot 1 based on a control program of the welding robot 1 (that is, a welding robot control program).

The teach pendant 4 is an input device having a role as a user interface through which the operator operates the teach pendant 4 to teach the welding robot 1. As the teach pendant 4, a teach pendant of the related art may be used, and the teach pendant 4 is not limited here. The operation box 5 is an input device including a switch, a button, and the like for an operator to control the robot controller 3. Similarly, as the operation box 5, an operation box of the related art may be used, and the operation box 5 is not limited here.

Overview of Welding System 300

Figure 2:
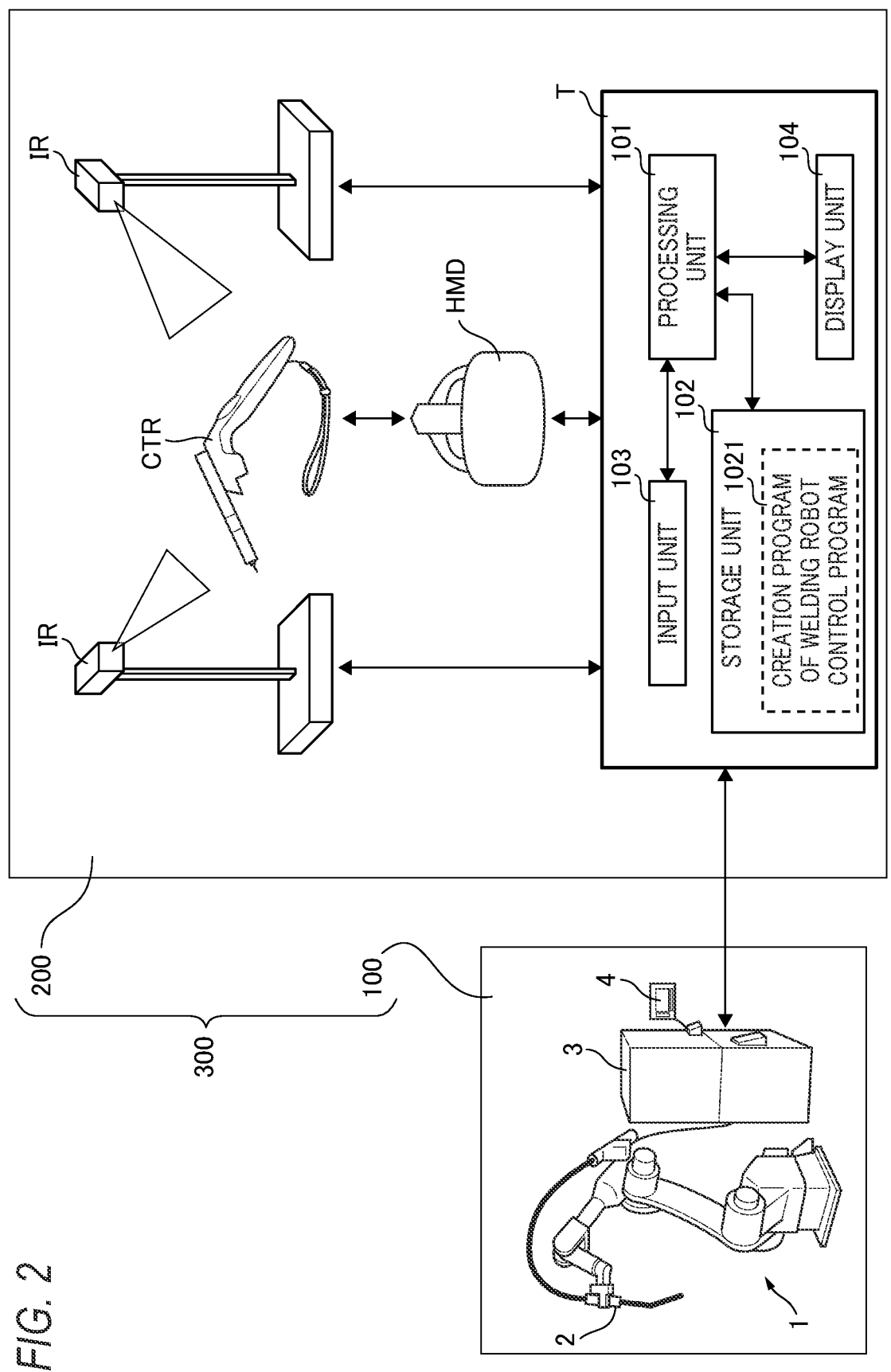
FIG. 2 is a conceptual diagram illustrating an example of a welding system.

FIG. 2 is a conceptual diagram illustrating an example of a welding system 300.

The welding system 300 includes the welding robot system 100 described with reference to FIG. 1 and a welding robot control program creation system 200. The welding robot control program creation system 200 includes a head mounted display HMD, a controller CTR, one or more base stations IR, and a welding robot control program creation device T.

The controller CTR is a device used for motion control of a mechanical device. In the present embodiment, the controller CTR is used for motion control of the torch 2 illustrated in FIG. 1.

The controller CTR has an outer shape that can be held by the operator. According to the present embodiment, the operator holds the controller CTR regarded as the torch 2. The controller CTR may have a front end portion having the same shape as the torch 2 such that the operator can intuitively designate a welding teaching point through which the torch 2 of the welding robot 1 passes while holding the controller CTR. The controller CTR includes an input unit that functions as a user interface such as a button, a switch, and a lever (not illustrated). The operator causes the controller CTR to store the welding teaching point by, for example, pressing the above-described button in a state in which the front end of the controller CTR corresponding to the front end of the torch 2 is actually brought into contact with a workpiece (not illustrated) to be welded. In addition, the operator can switch on and off a posture fixing function to be described later via a user interface included in the controller CTR, such as a button.

The controller CTR is connected to the head mounted display HMD such that data can be input and output between the controller CTR and the head mounted display HMD. Data communication between the controller CTR and the head mounted display HMD may be performed wirelessly or via a wire.

The controller CTR may transmit position information of the welding teaching point designated by the operator and posture information to be described later to the welding robot control program creation device T via the head mounted display HMD. The welding teaching point may include the welding start point and the welding end point of welding performed on the workpiece. When the head mounted display HMD is not used, the controller CTR may directly transmit the position information of the welding teaching point and the posture information to be described later to the welding robot control program creation device T without using the head mounted display HMD.

Posture Information

Figure 3:
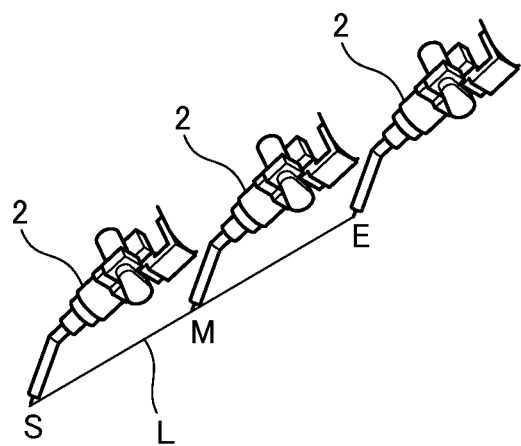
FIG. 3 is a conceptual diagram illustrating a movement of a torch in accordance with a welding robot control program created by a welding robot control program creation device according to the present disclosure.

The posture information is information capable of specifying a posture of the torch 2 included in the welding robot 1 with respect to the weld line at the welding teaching point on the weld line connecting the welding start point and the welding end point (see FIG. 3 and subsequent figures). For example, controller posture information, which is information indicating a posture of the controller CTR with the front end facing the welding teaching point, is an example of the posture information. The controller posture information is set such that when the controller CTR is regarded as the torch 2 and used for teaching, the robot controller 3 controls the welding robot 1 so that a direction of the front end of the controller CTR in a three-dimensional space matches a direction of the front end of the torch 2 in the three-dimensional space. Therefore, the welding robot control program creation device T can specify the posture of the torch 2 with respect to the weld line based on the controller posture information. The welding robot control program creation device T may acquire, as the posture information, the controller posture information indicating the posture of the controller CTR facing the welding teaching point.

The operator can also designate the welding teaching point by using the torch 2 itself instead of the controller CTR. In this case, for example, the robot controller 3 can acquire information indicating a posture of the torch 2 that varies in accordance with an operation input from the teach pendant 4 or the like. The welding robot control program creation device T may acquire the information indicating the posture of the torch 2 as the posture information from the robot controller 3. The welding robot control program creation device T may also acquire the above-described position information from the robot controller 3.

The head mounted display HMD can display a VR image to a person wearing the head mounted display HMD (hereinafter, referred to as a wearer). The wearer may be a person different from the operator described above, or may be the same person. The head mounted display HMD is connected to the welding robot control program creation device T such that data can be input and output between the head mounted display HMD and the welding robot control program creation device T. For example, the head mounted display HMD and the welding robot control program creation device T may be connected by a display cable, a USB cable, or the like. However, a mode of the connection is not limited thereto, and the head mounted display HMD and the welding robot control program creation device T may perform wireless communication with each other.

Here, according to the present embodiment, the head mounted display HMD is used as a device for relaying data exchange between the controller CTR and the welding robot control program creation device T. However, the welding robot control program creation system 200 may directly perform data communication between the controller CTR and the welding robot control program creation device T without providing the head mounted display HMD.

The base station IR is used by the welding robot control program creation device T to acquire the position information and the posture information of the controller CTR. The welding robot control program creation system 200 according to the present embodiment includes two base stations IR. The base stations IR may be connected to the welding robot control program creation device T such that data can be input and output between the base stations IR and the welding robot control program creation device T. The two base stations IR emit infrared rays toward the controller CTR. For example, the base stations IR turn on a flash, then emit infrared lasers from the bottom to the top, then turn on the flash, and then emit infrared lasers from the left to the right. The base stations IR repeatedly perform the above-mentioned four types of processing. On the other hand, the controller CTR includes a light receiving unit (not illustrated). The controller CTR calculates the position information of the welding teaching point (position information of the front end portion of the controller CTR when the button of the controller CTR is pressed by the operator) and the controller posture information based on an arrival time, angle information, and the like of light received from the base station IR by the light receiving unit. Instead of the controller CTR, the head mounted display HMD or the welding robot control program creation device T may calculate the position information of the welding teaching point and the controller posture information.

A method of acquiring the position information of the welding teaching point and the controller posture information is not limited to the above-described example. For example, the base station IR has a projection function of structured light and a function of an infrared camera, and when the structured light projected on the controller CTR is captured by the infrared camera and the captured image is subjected to image processing, the welding robot control program creation device T can acquire the above-described position information and controller posture information. In addition, the welding robot control program creation device T may be provided with a plurality of cameras instead of a plurality of base stations IR, capture images of the workpiece and the controller CTR with the cameras, and calculate the above-described position information and controller posture information based on feature points or the like included in the captured images. The welding robot control program creation device T may acquire the above-described position information and controller posture information by a method other than these methods.

The welding robot control program creation device T is connected to the head mounted display HMD, the base station IR, and the robot controller 3 such that data can be input and output between the welding robot control program creation device T and the head mounted display HMD, the base station IR, and the robot controller 3. When the head mounted display HMD is not used, the welding robot control program creation device T may be connected to the controller CTR such that data can be input and output between the welding robot control program creation device T and the controller CTR. The welding robot control program creation device T may be connected to other devices by, for example, a LAN cable, other connection cables, or wirelessly. The welding robot control program creation device T may be, for example, a gaming PC or the like, but is not limited thereto.

The welding robot control program creation device T may include a processing unit 101, a storage unit 102, an input unit 103, and a display unit 104. The welding robot control program creation device T may include other components.

The processing unit 101 is configured using, for example, a central processing unit (CPU), a micro processing unit (MPU), a digital signal processor (DSP), or a field programmable gate array (FPGA). The processing unit 101 performs a control process for controlling the overall operation of respective units of the welding robot control program creation device T, a process of inputting and outputting data or information into and from the respective units of the welding robot control program creation device T, a process of calculating data, and a process of storing data or information.

The storage unit 102 may include a hard disk drive (HDD), a read only memory (ROM), a random access memory (RAM), and the like, and stores various programs (an operating system (OS), application software, and the like) to be executed by the processing unit 101, and various data. The storage unit 102 may store a program for creating a control program of the welding robot 1 (hereinafter, referred to as a creation program of welding robot control program 1021). The creation program of welding robot control program 1021 may be executed by the processing unit 101.

The input unit 103 may include a track pad, a keyboard, a mouse, and the like, has a function as a human interface with the operator, and inputs an operation of the operator. In other words, the input unit 103 is used for input or instruction in various processes executed by the processing unit 101.

The display unit 104 may be configured using a display device such as a liquid crystal display (LCD) or an organic electroluminescence (EL). The display unit 104 may display, for example, what kind of welding robot control program the processing unit 101 creates based on the creation program of welding robot control program 1021, the position information of the welding teaching point, and the controller posture information.

Storage of Welding Teaching Point

FIG. 3 is a conceptual diagram illustrating a movement of the torch 2 in accordance with the welding robot control program created by the welding robot control program creation device T according to the present disclosure. Reference is also made to FIG. 2. The operator moves the held controller CTR and presses the button or the like when the front end of the controller CTR reaches a welding start point S and a welding end point E of the workpiece. Thus, the welding start point S and the welding end point E are stored in the controller CTR as welding teaching points. Note that a welding teaching point to be stored is not limited to the welding start point S and the welding end point E. For example, any intermediate point M on the weld line L connecting the welding start point S and the welding end point E may be stored as a welding teaching point. In addition, the welding teaching point may be a point that is not on the weld line L connecting the welding start point S and the welding end point E, and may be, for example, an air-cut point to be described later based on FIGS. 8 to 16 or a position of the front end of the torch 2 when the welding robot 1 is in a standby posture.

The welding robot control program creation device T acquires, from the controller CTR, position information of the welding start point S and the welding end point E and posture information indicating postures of the controller CTR when the front end of the controller CTR is located at a position of the welding start point S and a position of the welding end point E.

The processing unit 101 creates a welding robot control program for performing welding from the welding start point S to the welding end point E on the workpiece based on the acquired position information and posture information. The processing unit 101 transmits the created welding robot control program to the robot controller 3. The robot controller 3 executes the received welding robot control program to move the welding robot 1. The welding robot 1 performs welding on the workpiece using the torch 2 based on the welding teaching points (the welding start point S, the welding end point E, and the like) set by the operator.

Figure 17:
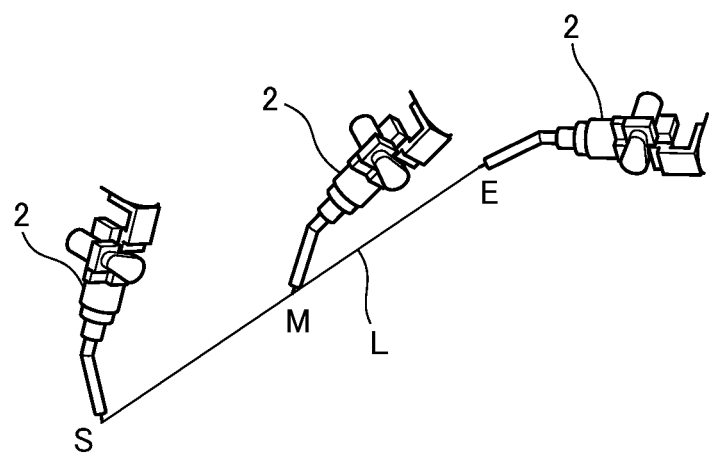
FIG. 17 is a comparative diagram illustrating postures of the torch, when teaching is performed and welding is performed from a welding start point to a welding end point along the weld line.

FIG. 17 is a comparative diagram illustrating postures of the torch 2 in a case where teaching is performed and welding is performed from the welding start point S to the welding end point E along the weld line L. The example according to the present disclosure illustrated in FIG. 3 and the example illustrated in FIG. 17 are different in posture of the torch 2 with respect to the weld line L.

When the operator holds the controller CTR and manually designates the welding start point S, the welding end point E, and the like as the welding teaching points, it is difficult to maintain the posture of the torch 2 with respect to the weld line L constant. In the case of the example illustrated in FIG. 17, a posture of the torch 2 with respect to the weld line L at an intermediate portion (for example, at the intermediate point M) of the weld line L is a posture that interpolates between the posture of the torch 2 with respect to the weld line L at the welding start point S and the posture of the torch 2 with respect to the weld line L at the welding end point E. More specifically, the posture of the torch 2 is changed such that an opposite side of the torch 2 from the front end gradually falls toward the weld line L from the welding start point S to the welding end point E.

On the other hand, if the torch 2 can perform welding such that the posture of the torch 2 with respect to the weld line L is constant from the welding start point S to the welding end point E, the quality of welding is stabilized, which is preferable. Therefore, as illustrated in FIG. 3, the welding robot control program creation device T according to the present disclosure creates a control program of a welding robot for performing welding from the welding start point S toward the welding end point E along the weld line L while maintaining the posture of the torch 2 with respect to the weld line L at the welding start point S.

In addition, as in an example illustrated in FIG. 7 to be described later, there may be a situation in which the posture of the torch 2 with respect to the weld line L cannot be maintained constant from the beginning to the end. In this case, the posture of the torch 2 may be maintained constant for each of a plurality of sections constituting the weld line L.

Switching of Posture Fixing Function

The creation program of welding robot control program 1021 may include two control modes. A first control mode is a posture fixed mode in which the posture fixing function is turned on. A second control mode is a posture non-fixed mode in which the posture fixing function is turned off.

In the case of the posture fixed mode, the posture of the torch 2 included in the welding robot 1 that operates according to the created welding robot control program does not follow a posture change of the controller CTR, and maintains a constant posture. For example, the torch 2 moves while an angle of the torch 2 with respect to the weld line L remains relatively unchanged at the welding start point S (see FIG. 3). The welding robot control program creation device T creates a welding robot control program for performing, in a posture fixed section of the weld line L in which the posture of the torch 2 is fixed, welding along the weld line L up to an end point of the posture fixed section while maintaining a posture of the torch 2 with respect to the weld line L at a start point of the posture fixed section.

In the case of the posture non-fixed mode, the posture of the torch 2 included in the welding robot 1 that operates according to the created welding robot control program changes following the posture change of the controller CTR. For example, the torch 2 moves while the angle of the torch 2 with respect to the weld line L at the welding start point S changes (see FIGS. 6 and 7). The welding robot control program creation device T creates a welding robot control program for performing, in a posture non-fixed section of the weld line L in which the posture of the torch 2 is not fixed, welding along the weld line such that the posture of the torch 2 with respect to the weld line L follows a posture of the torch 2 specified based on the posture information.

Mode switching between the posture fixed mode and the posture non-fixed mode may be performed by a user interface (see the above description), such as a push button, included in the controller CTR. In addition, the mode switching operation may be performed by a line of sight of the operator wearing the head mounted display HMD. The mode switching operation may be performed by a mouse, a keyboard, or the like included in the input unit 103 of the welding robot control program creation device T.

As illustrated in FIG. 3, the welding robot 1 provided with the torch 2 performs the welding from the welding start point S to the welding end point E along the weld line L corresponding to the workpiece in accordance with a movement of the front end portion of the controller CTR held by the operator at the time of creating the welding robot control program. In the case of the posture fixed mode, even when the posture of the controller CTR held by the operator changes due to camera shake or the like, the posture change is not reflected in the posture of the torch 2, and the torch 2 performs the welding from the welding start point S to the welding end point E along the weld line L while maintaining a predetermined posture with respect to the weld line L.

Posture Fixed Section

As described above, there may be a situation in which the torch 2 cannot maintain Therefore, the posture of the torch 2 may be fixed in a section of the weld line L in which the posture of the torch 2 is fixed. When the posture fixed section of the weld line L in which the posture of the torch 2 is fixed is from the welding start point S to the welding end point E, the welding robot control program creation device T creates a welding robot control program for performing welding along the weld line L up to the end point of the posture fixed section, that is, the welding end point E, while maintaining a constant posture of the torch with respect to the weld line L at the start point of the posture fixed section, that is, the welding start point S.

The start point of the posture fixed section may not be the welding start point S. For example, the start point of the posture fixed section may be a point between the welding start point S and the welding end point E (see FIG. 7). Similarly, the end point of the posture fixed section may not be the welding end point E. For example, the end point of the posture fixed section may be a point between the welding start point S and the welding end point E (see FIG. 7). The start point of the posture fixed section is closer to the welding start point S than the end point of the posture fixed section.

Figure 4:
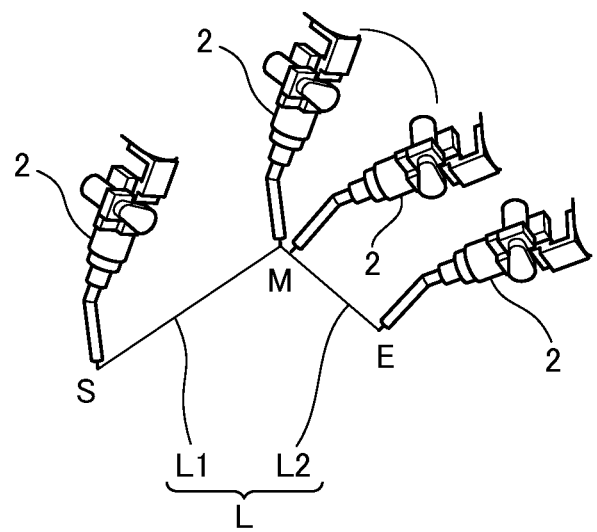
FIG. 4 is a conceptual diagram illustrating a movement of the torch in accordance with the welding robot control program when a weld line is bent.
Figure 5:
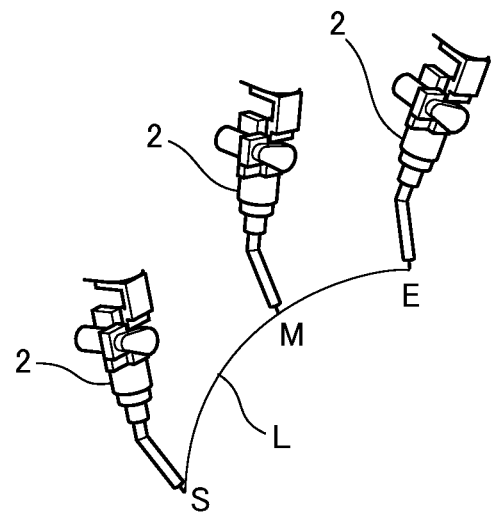
FIG. 5 is a conceptual diagram illustrating a movement of the torch in accordance with the welding robot control program when the weld line is curved.

FIG. 4 is a conceptual diagram illustrating a movement of the torch 2 in accordance with the welding robot control program when the weld line L is bent. FIG. 5 is a conceptual diagram illustrating a movement of the torch 2 in accordance with the welding robot control program when the weld line L is curved.

The operator operates the controller CTR to perform teaching to the welding robot 1 in order to set a plurality of welding teaching points on the weld line L. That is, the operator brings the front end of the controller CTR corresponding to the front end of the torch 2 into contact with the workpiece to be welded, and causes the controller CTR to store three points of the welding start point S, the intermediate point M, and the welding end point E as welding teaching points. The user interface (see the above description) included in the controller CTR, such as a button, is used to store the welding teaching points.

As a result, information on the welding teaching points (position information, controller posture information, control information of the posture fixed mode or the posture non-fixed mode, and the like) is transmitted to the welding robot control program creation device T. A transmission timing of the information on the welding teaching points may be when the information is stored by the controller CTR. In addition, the information on the welding teaching points may be transmitted at a timing when the information is accumulated to some extent in the controller CTR, or may be periodically transmitted at predetermined time intervals.

The creation program of welding robot control program 1021 may include two or more determination modes of the weld line L when there are welding teaching points other than the welding start point S and the welding end point E on the weld line L. A first determination mode of the weld line L is a determination mode in which the weld line L is determined so as to connect two welding teaching points by a straight line. When the creation program of welding robot control program 1021 determines the weld line L by using the three points of the welding start point S, the intermediate point M, and the welding end point E as welding teaching points in accordance with the first determination mode, as illustrated in FIG. 4, a bent weld line L formed of a line segment L1 from the welding start point S to the intermediate point M and a line segment L2 from the intermediate point M to the welding end point E is determined.

In the case of the posture fixed mode, the torch 2 included in the welding robot 1 that operates according to the welding robot control program performs the welding while maintaining a predetermined posture with respect to the weld line L. Therefore, in the case of the example illustrated in FIG. 4, the torch 2 performs the welding along the weld line L while maintaining a predetermined angle with respect to the line segment L1 from the welding start point S to the intermediate point M included in the weld line L. When the front end of the torch 2 reaches the intermediate point M, the torch 2 changes a direction thereof and performs welding along the weld line L while maintaining a predetermined angle with respect to the line segment L2 from the intermediate point M to the welding end point E included in the weld line L.

The second determination mode of the weld line L is a determination mode in which the weld line L is determined such that three or more welding teaching points are smoothly connected by a curve. When the creation program of welding robot control program 1021 determines the weld line L using the three points of the welding start point S, the intermediate point M, and the welding end point E as the welding teaching points in accordance with the second determination mode, as illustrated in FIG. 5, a curved weld line L smoothly connecting the welding start point S, the intermediate point M, and the welding end point E is determined.

The creation program of welding robot control program 1021 may have a set value indicating a determination mode of the weld line L as an initial value in advance. In addition, the determination mode of the weld line L may be changed by any of the controller CTR, the head mounted display HMD, and the input unit 103 of the welding robot control program creation device T.

In the case of the posture fixed mode, the torch 2 included in the welding robot 1 that operates according to the welding robot control program performs the welding while maintaining a predetermined posture with respect to the weld line L. Therefore, in the case of the example illustrated in FIG. 5, the torch 2 performs the welding from the welding start point S to the welding end point E along the weld line L while gradually changing an angle in space so as to maintain an angle with respect to the weld line L.

Figure 6:
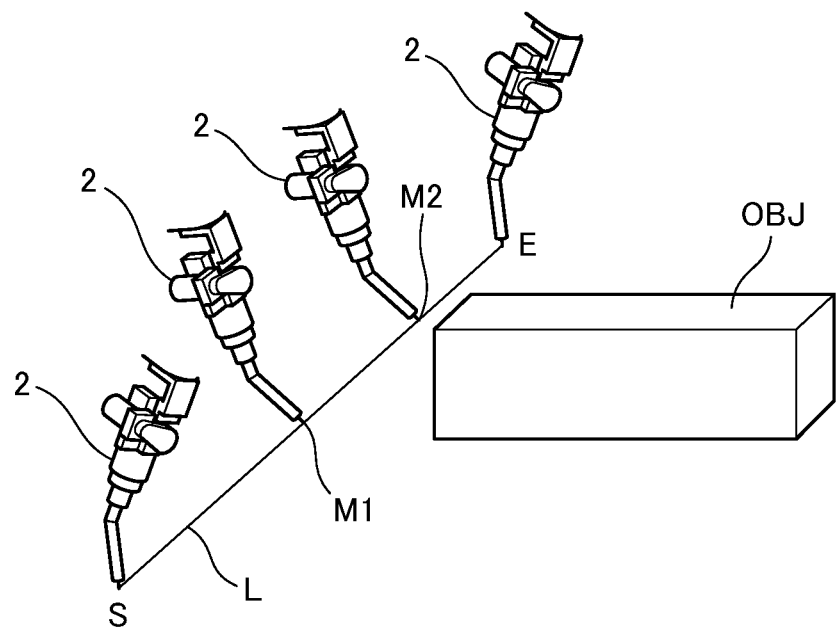
FIG. 6 is a conceptual diagram illustrating a movement of the torch in accordance with the welding robot control program when an object is in the vicinity of the weld line.

FIG. 6 is a conceptual diagram illustrating a movement of the torch 2 in accordance with the welding robot control program when an object OBJ is in the vicinity of the weld line L.

When welding is performed on a workpiece, an object OBJ such as a jig may be present in the vicinity of the weld line L. In the case of the posture fixed mode, the torch 2 moves to the welding end point E while maintaining the posture at the welding start point S. Therefore, the torch 2 may collide with the object OBJ. In such a case, the welding robot control program creation device T creates a welding robot control program in which the torch 2 moves while changing the posture so as to avoid the object OBJ using the posture non-fixed mode.

In order for the torch 2 to perform the welding along the weld line L while avoiding the object OBJ, the operator performs, for example, the following operation on the controller CTR.

When the front end of the controller CTR regarded as the torch 2 reaches a position of the welding start point S of the workpiece to be welded, the operator causes the controller CTR to store the welding start point S as a welding teaching point in a state in which the control mode is set to the posture fixed mode. The switching of the control mode and the storage of the welding teaching point may be performed using the user interface included in the controller CTR, such as a button.

The operator moves the controller CTR. When the front end of the controller CTR regarded as the torch 2 moves to a point M1 in the vicinity of the object OBJ on the weld line L, the operator switches the control mode from the posture fixed mode to the posture non-fixed mode. In this case, the point M1 may be stored in the controller CTR as a welding teaching point.

The operator tilts the controller CTR by a predetermined angle. Here, as described above, in the case of the posture non-fixed mode, the posture of the torch 2 included in the welding robot 1 that operates according to the welding robot control program changes following the posture change of the controller CTR. Therefore, as illustrated in FIG. 6, the torch 2 at the time of welding is in a state in which the angle with respect to the weld line L is changed (in the vicinity of the point M1). Since the posture of the torch 2 is changed, there is no possibility that the torch 2 collides with the object OBJ.

The operator operates the controller CTR again to switch the control mode to the posture fixed mode. Then, the operator moves the controller CTR such that the front end of the controller CTR regarded as the torch 2 reaches a point M2 in the vicinity of the object OBJ on the weld line L. In the case of the posture fixed mode, since the welding robot control program is created such that the torch 2 moves in a state in which the posture of the torch 2 is fixed, as illustrated in FIG. 6, the posture of the torch 2 with respect to the weld line L is maintained constant from the vicinity of the point M1 to the vicinity of the point M2. Since the front end of the torch 2 moves from the point M1 to the point M2 while the posture of the torch 2 is changed, the torch 2 does not collide with the object OBJ.

The operator switches the control mode from the posture fixed mode to the posture non-fixed mode. In this case, the point M2 may be stored in the controller CTR as a welding teaching point. The operator tilts the controller CTR by a predetermined angle. In the case of the posture non-fixed mode, since the posture of the torch 2 follows the posture of the controller CTR, the operator can return the posture of the torch 2 at the time of welding to a substantially original posture (the posture of the torch 2 at the welding start point S in FIG. 6). The operator operates the controller CTR again to switch the control mode to the posture fixed mode.

When the mode is switched to the posture fixed mode, the operator moves the controller CTR. When the front end of the controller CTR regarded as the torch 2 reaches a position of the welding end point E of the weld line L, the welding end point E is stored in the controller CTR as a welding teaching point.

For example, when the operator performs the above-described operation on the controller CTR, the processing unit 101 of the welding robot control program creation device T that has acquired the above-described position information and posture information from the controller CTR creates a welding robot control program based on the acquired information, and transmits the created welding robot control program to the robot controller 3. As illustrated in FIG. 6, the robot controller 3 controls the welding robot 1 according to the created welding robot control program such that the torch 2 moves while changing the posture thereof so as to avoid the object OBJ.

Figure 7:
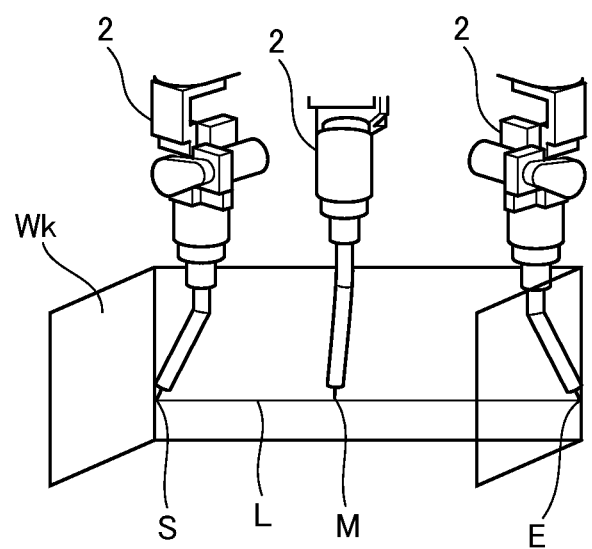
FIG. 7 is a conceptual diagram illustrating a movement of the torch in accordance with the welding robot control program when an inner side of a wall of a workpiece is welded.

FIG. 7 is a conceptual diagram illustrating a movement of the torch 2 in accordance with the welding robot control program when an inner side of a wall of a workpiece Wk is welded. As illustrated in FIG. 7, the workpiece Wk to be welded according to the present embodiment, has a shape in which three walls form a U shape.

When welding the inner side of the wall of the workpiece Wk, the welding is performed while changing the direction of the torch 2 along the wall of the workpiece Wk such that the torch 2 does not collide with the wall. In this case, the posture of the torch 2 with respect to the weld line L cannot be maintained constant in the first place. Therefore, the torch 2 may be maintained in a constant posture only in an intermediate section on the weld line L. In order to teach such a welding operation to the welding robot 1, the operator may operate the controller CTR, for example, as follows.

The operator brings the front end of the controller CTR regarded as the torch 2 into contact with a position of the welding start point S of the workpiece Wk in a state in which the control mode is set to the posture non-fixed mode. According to the present embodiment, the welding start point S is located at a position where two walls forming the workpiece Wk are in contact with each other.

While the front end of the controller CTR is maintained in contact with the position of the welding start point S of the workpiece Wk, the operator causes the controller CTR to store the welding start point S as a welding teaching point by, for example, pressing the button of the controller CTR.

Next, the operator brings the front end of the controller CTR into contact with a point (not illustrated) on the weld line L slightly away from the welding start point S of the workpiece Wk, and switches the control mode from the posture non-fixed mode to the posture fixed mode. When the control mode is switched, a point on the weld line L with which the front end of the controller CTR is in contact may be stored in the controller CTR as a welding teaching point. Thereafter, in a section up to the next welding teaching point, the posture of the torch 2 with respect to the weld line L is maintained at a constant posture (for example, the posture at the intermediate point M illustrated in FIG. 7).

According to the present embodiment, the welding end point E is located at a position where two walls forming the workpiece Wk are in contact with each other, similarly to the welding start point S. The operator operates the controller CTR again in the vicinity of the welding end point E to switch the control mode from the posture fixed mode to the posture non-fixed mode. When the control mode is switched, the point on the weld line L with which the front end of the controller CTR is in contact may be stored in the controller CTR as a welding teaching point.

The operator brings the front end of the controller CTR into contact with the position of the welding end point E. Then, the operator causes the controller CTR to store the welding end point E as a welding teaching point by, for example, pressing the button of the controller CTR.

When the operator operates the controller CTR, for example, as described above, the torch 2 moves as follows in accordance with the created welding robot control program. In the vicinity of the welding start point S and the vicinity of the welding end point E of the weld line L, the posture of the torch 2 follows the posture of the controller CTR. In other sections of the weld line L, the posture of the torch 2 is fixed. Therefore, the torch 2 can perform welding along the weld line L without colliding with the inner wall of the workpiece Wk.

FIGS. 8 to 16 are display examples by a display unit 104 corresponding to first to ninth welding teaching points, respectively.

The display examples illustrated in FIGS. 8 to 16 correspond to images to be displayed on the display unit 104 when the processing unit 101 of the welding robot control program creation device T executes the creation program of welding robot control program 1021. However, these images may be displayed on a screen or the like included in the head mounted display HMD or other devices. The operator operates the controller CTR to perform teaching to the welding robot 1 while viewing the images displayed on the display unit 104 or the like.

According to the present embodiment, a window W displayed on the display unit 104 or the like is divided into three panes of a first pane P1, a second pane P2, and a third pane P3. However, the pane division of the window W is merely an example, and other display modes may be adopted.

On the first pane P1, a virtual model of the welding robot 1 provided with the torch 2 is displayed. The first pane P1 may also display an operation path of the torch 2 included in the welding robot 1. An x-axis, a y-axis, and a z-axis illustrated in the figures are coordinate axes orthogonal to each other. In this example, the direction of the torch 2 is the x-axis.

On the second pane P2, information related to the welding teaching point on the operation path of the torch 2 is displayed. As the information related to the welding teaching point, for example, the following information may be displayed. Types of movement commands for moving torch 2 (MOVEL, MOVEP, etc.) Identifier of welding teaching point (P001, etc.)•Moving speed of torch 2.

On the third pane P3, values of various control parameters for the welding teaching points selected to be displayed on the second pane P2 are displayed. The control parameters to be displayed are, for example, as follows. Welding (ON: welding is performed; OFF: welding is not performed) Moving speed of torch 2 (AUTO: moving speed automatically set by program; Numerical value designation: moving speed based on the numerical value) Fixation of torch posture (ON: the above-described posture fixed mode; OFF: the above-described posture non-fixed mode; AUTO: automatically set as ON or OFF)

Figure 8:
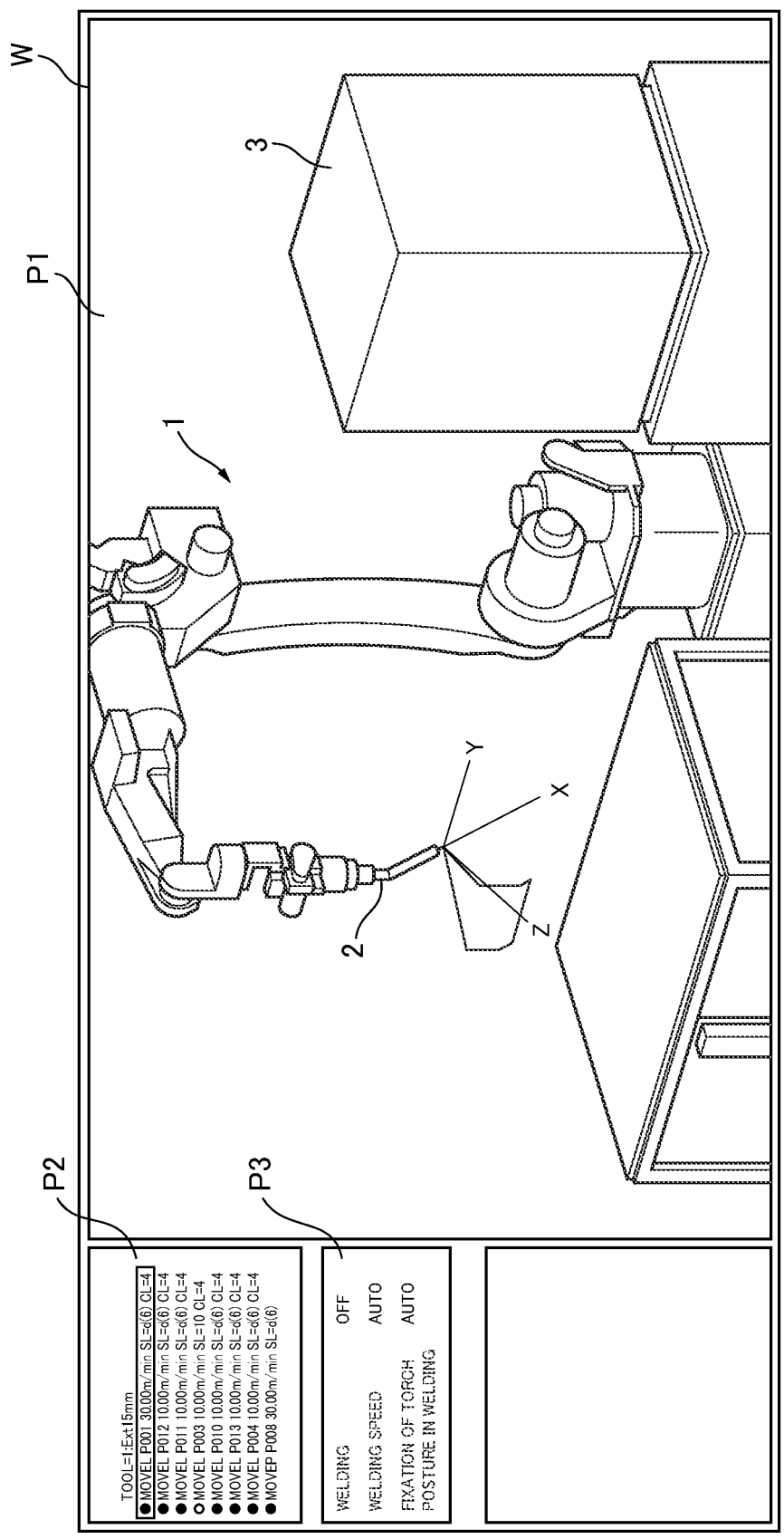
FIG. 8 is a display example on a display unit corresponding to a first welding teaching point.

FIG. 8 illustrates a state in which the front end of the torch 2 points to a first welding teaching point. The first welding teaching point corresponds to a position of the front end of the torch 2 when the welding robot 1 is in the standby posture. The standby posture of the welding robot 1 is a posture in a case where the welding robot 1 is at an initial position when the welding robot 1 starts the welding.

Figure 9:
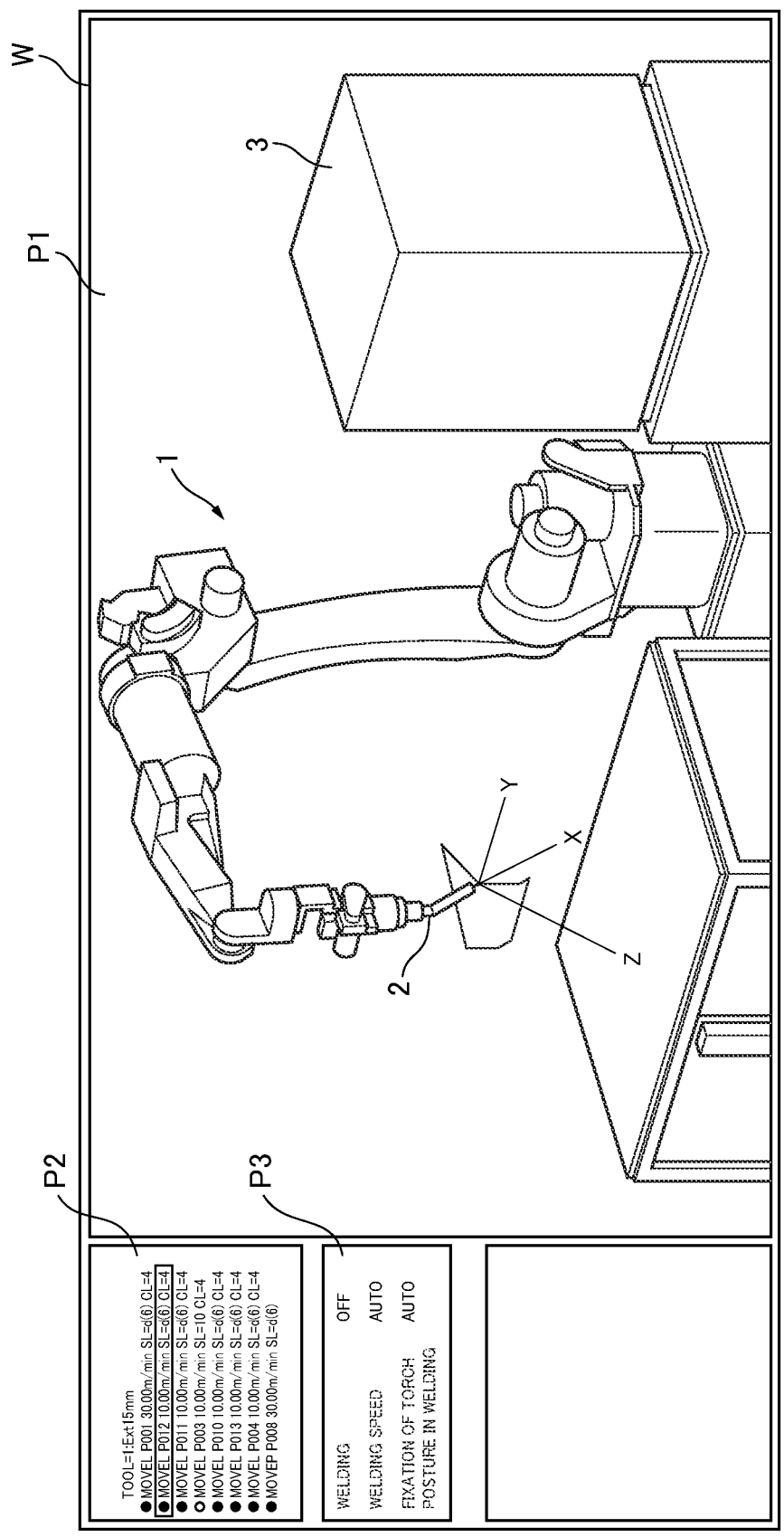
FIG. 9 is a display example on the display unit corresponding to a second welding teaching point.
Figure 10:
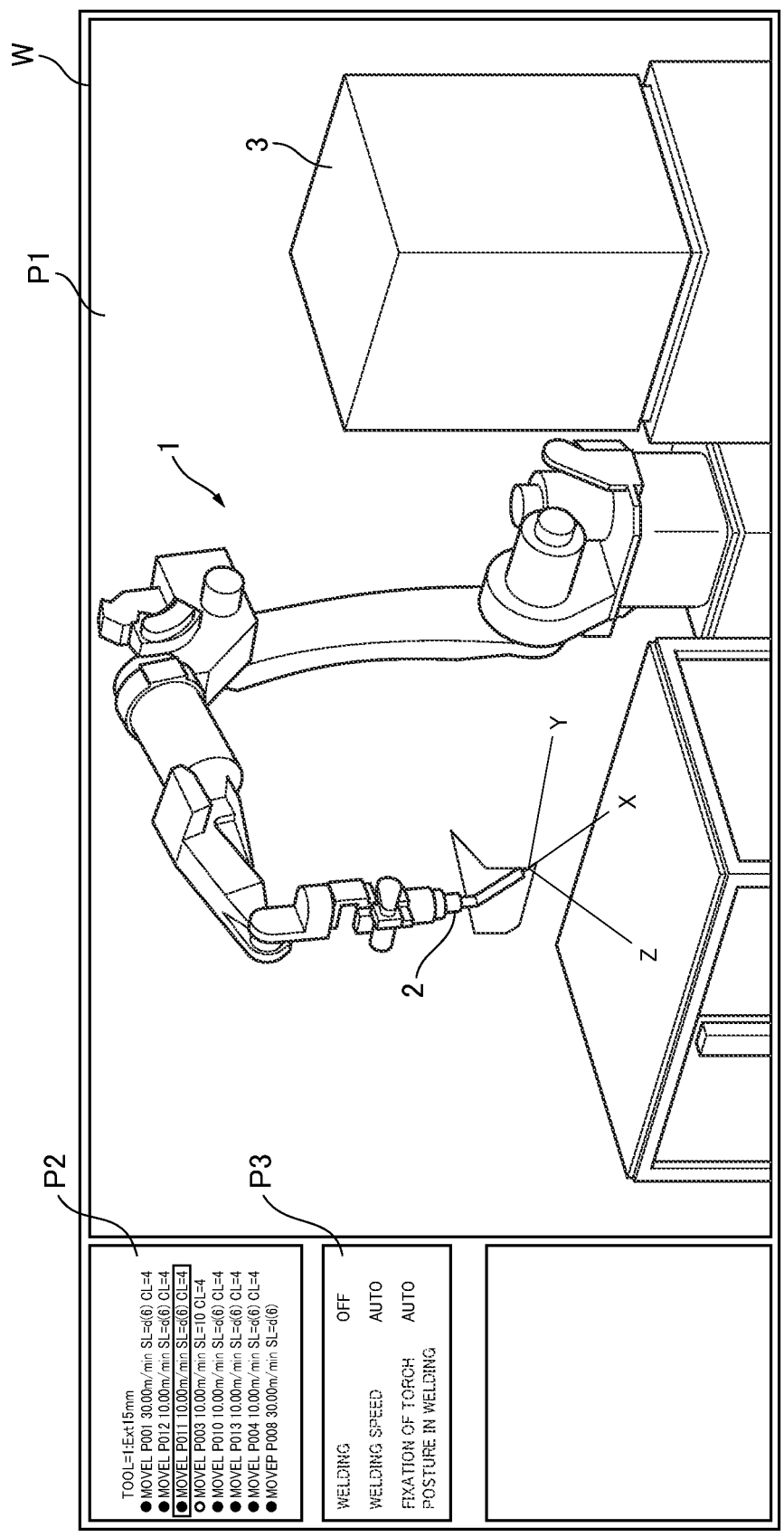
FIG. 10 is a display example on the display unit corresponding to a third welding teaching point.

FIG. 9 illustrates a state in which the front end of the torch 2 points to a second welding teaching point. FIG. 10 illustrates a state in which the front end of the torch 2 points to a third welding teaching point. The second welding teaching point and the third welding teaching point are air-cut points. Air-cut means that the torch 2 moves without welding the workpiece.

Figure 11:
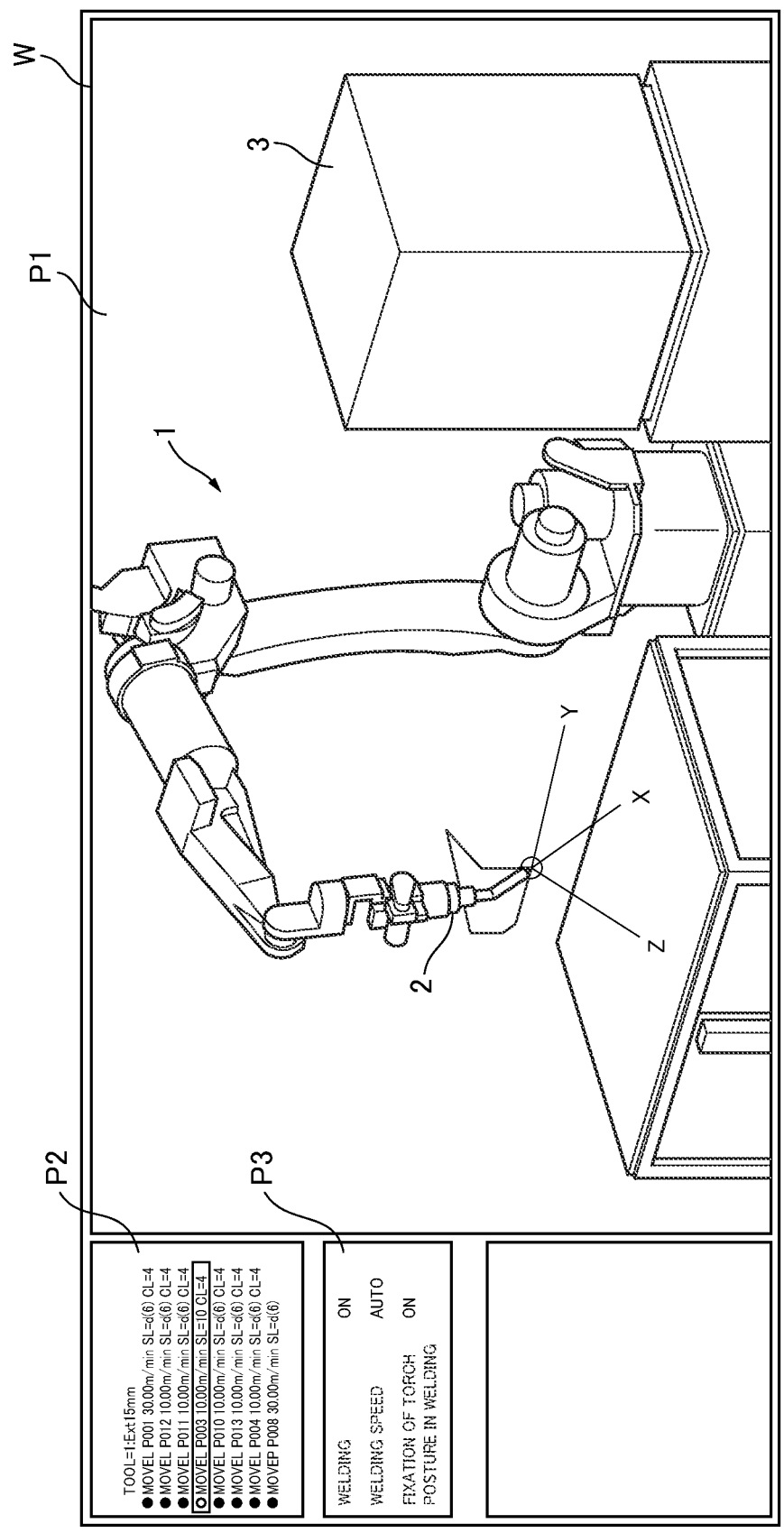
FIG. 11 is a display example on the display unit corresponding to a fourth welding teaching point.

FIG. 11 illustrates a state in which the front end of the torch 2 points to a fourth welding teaching point. The fourth welding teaching point is a welding start point. The welding start point corresponds to the welding start point S illustrated in FIGS. 3 to 7. Since the welding is performed from the welding start point to the welding end point, the values of the control parameters to be displayed on the third pane P3 are ON for welding and ON for fixation of torch posture. In addition, a white circle is displayed on a left side of information related to the fourth welding teaching point selected and displayed (highlighted) in the second pane P2. According to the present embodiment, a white circle indicates that welding is performed after the welding teaching point, and a black circle indicates that welding is not performed after the welding teaching point.

Figure 12:
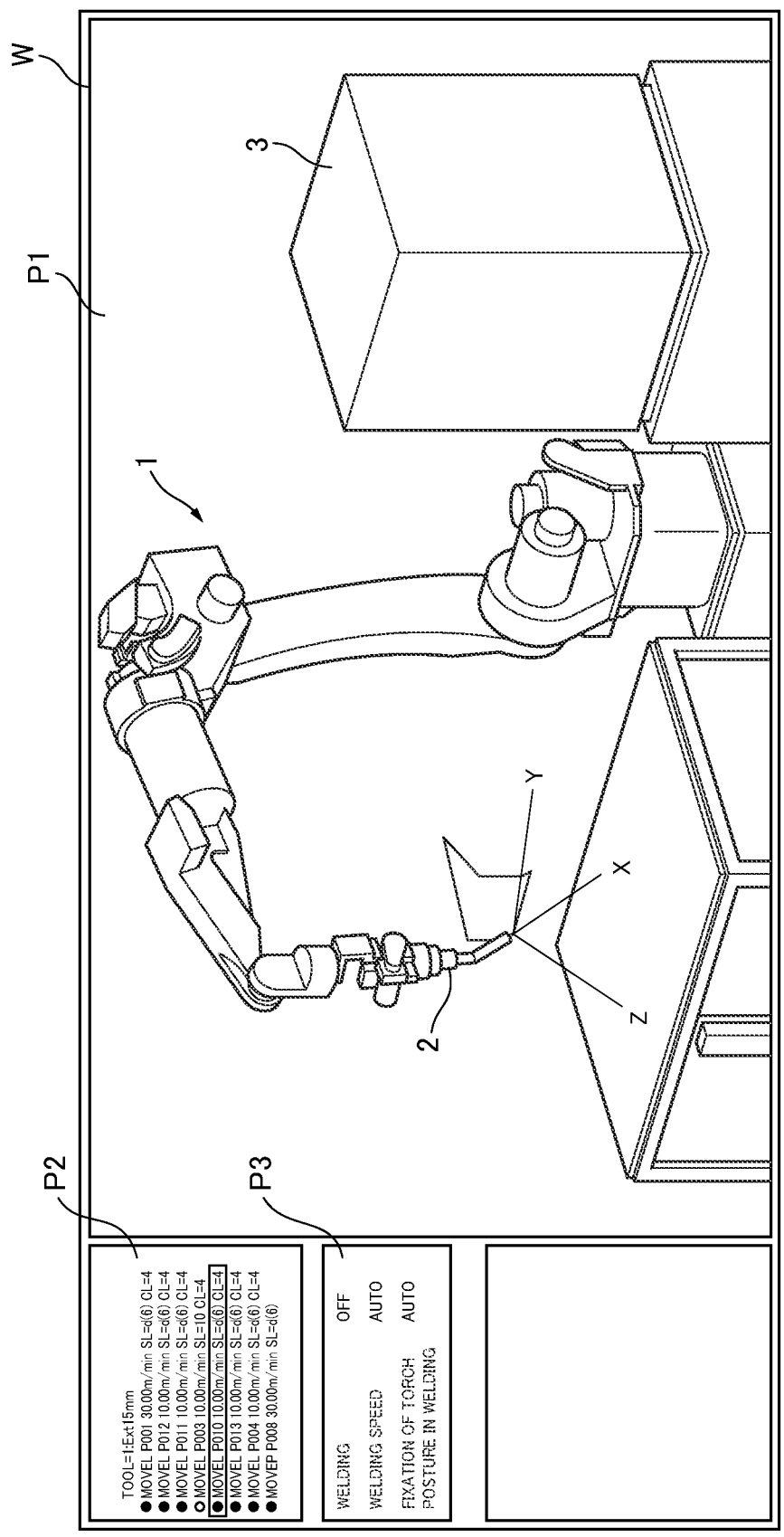
FIG. 12 is a display example on the display unit corresponding to a fifth welding teaching point.

FIG. 12 illustrates a state in which the front end of the torch 2 points to a fifth welding teaching point. The fifth welding teaching point is a welding end point. The welding end point corresponds to the welding end point E illustrated in FIGS. 3 to 7. Since the torch 2, which has performed the welding to the welding end point, performs air-cut (the torch 2 runs idle), the values of the control parameters to be displayed on the third pane P3 are OFF for welding and AUTO (which may be ON or OFF) for fixation of torch posture.

Figure 13:
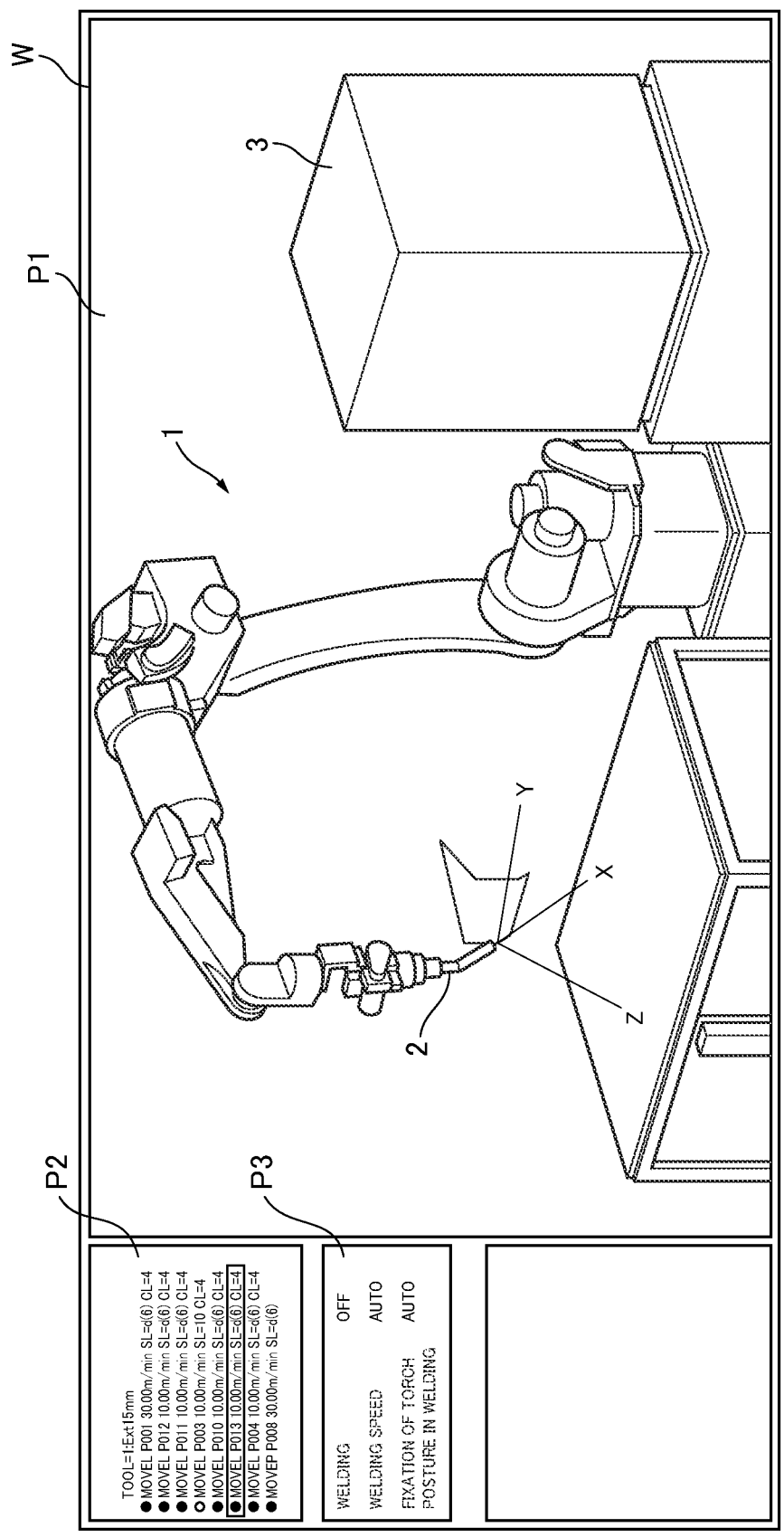
FIG. 13 is a display example on the display unit corresponding to a sixth welding teaching point.
Figure 14:
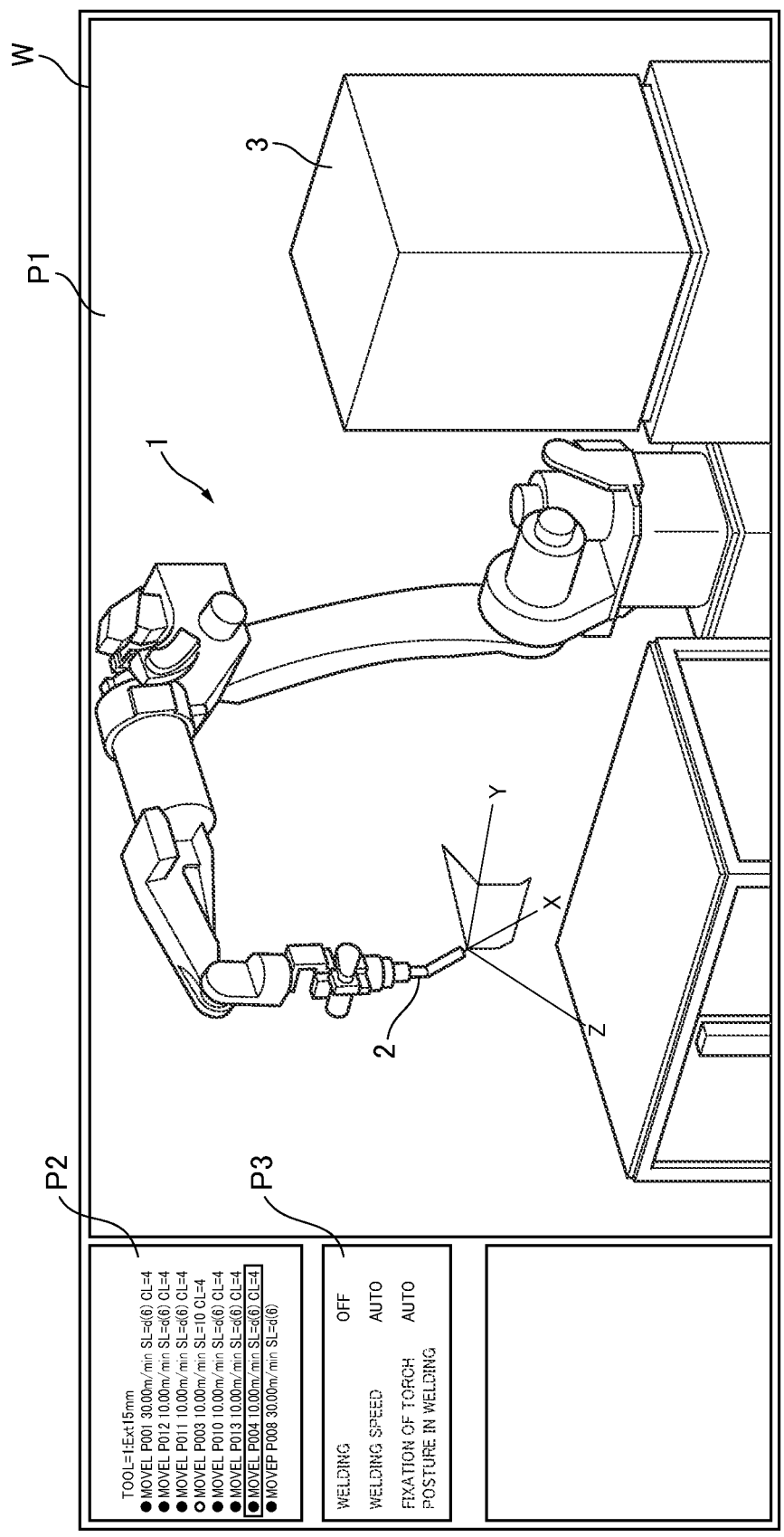
FIG. 14 is a display example on the display unit corresponding to a seventh welding teaching point.

FIG. 13 illustrates a state in which the front end of the torch 2 points to a sixth welding teaching point. FIG. 14 illustrates a state in which the front end of the torch 2 points to a seventh welding teaching point. The sixth welding teaching point and the seventh welding teaching point are air-cut points.

Figure 15:
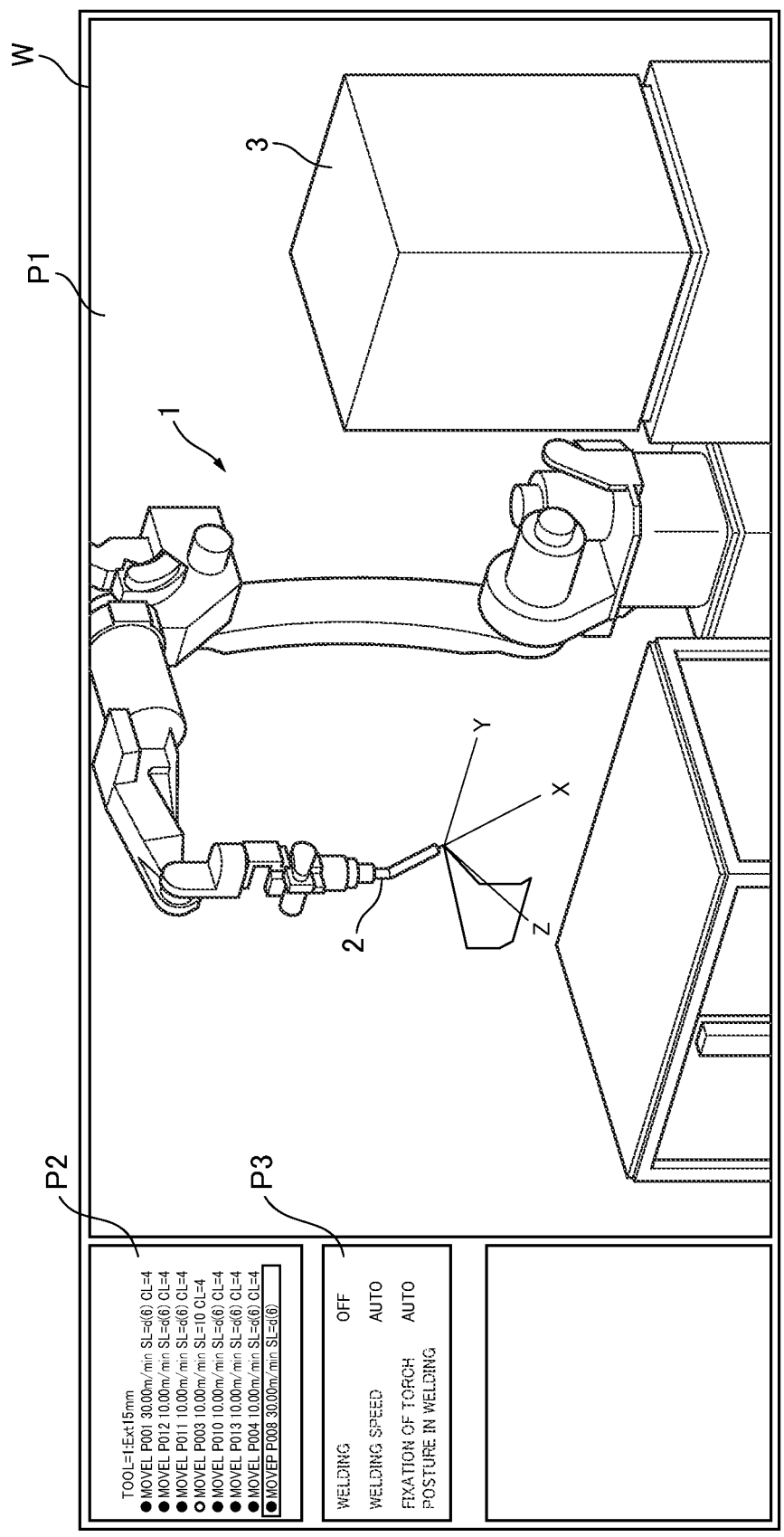
FIG. 15 is a display example on the display unit corresponding to an eighth welding teaching point.

FIG. 15 illustrates a state in which the front end of the torch 2 points to an eighth welding teaching point. The eighth welding teaching point corresponds to a position of the front end of the torch 2 when the welding robot 1 is in the standby posture. The standby posture of the welding robot 1 is a posture of the welding robot 1 when the welding robot 1 is at an end position after the welding is completed. In this example, a start position (see FIG. 8) and the end position (see FIG. 15) of the welding robot 1 are the same, and the first welding teaching point and the eighth welding teaching point are the same. However, positions of the first welding teaching point and the eighth welding teaching point may be different from each other.

Figure 16:
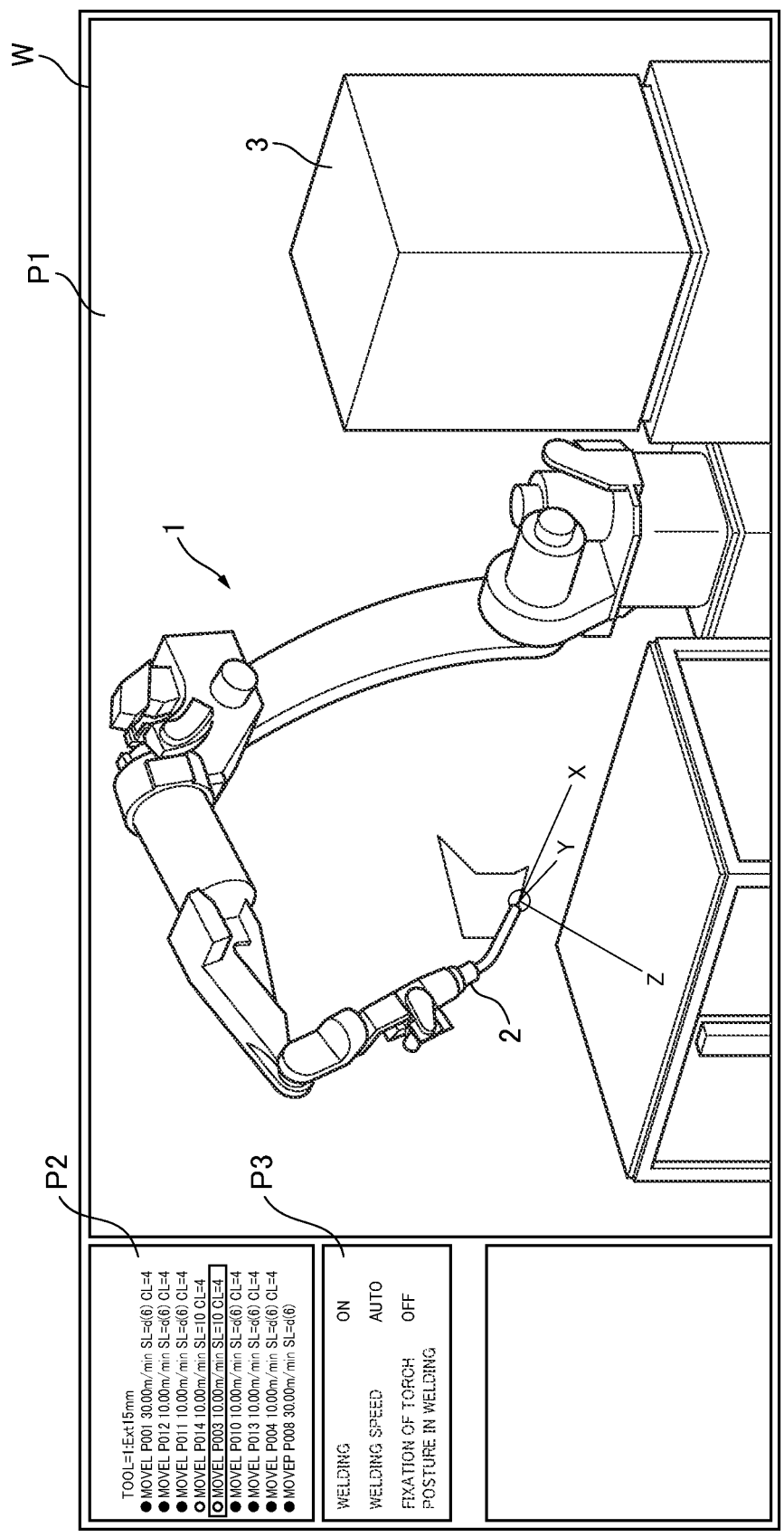
FIG. 16 is a display example on the display unit corresponding to a ninth welding teaching point.

FIG. 16 illustrates a state in which the front end of the torch 2 points to a ninth welding teaching point. The ninth welding teaching point is an intermediate point additionally provided between the fourth welding teaching point (welding start point S) and the fifth welding teaching point (welding end point E) in order for the torch 2 to avoid an object such as a jig. This intermediate point corresponds to the point M1 or the point M2 illustrated in FIG. 6. Comparing FIG. 11 and FIG. 16, an angle of the torch 2 with respect to the weld line at the ninth welding teaching point is different from an angle of the torch 2 with respect to the weld line at the fourth welding teaching point. In order to implement the above description, the values of the control parameters to be displayed on the third pane P3 in FIG. 16 are ON for welding and OFF for fixation of torch posture.

Modification

In FIG. 2, the robot controller 3, the welding robot control program creation device T, and the controller CTR are separate devices. However, these devices may be integrated into one device. For example, the robot controller 3 may be integrated with the welding robot control program creation device T. In addition, the controller CTR may be integrated with the welding robot control program creation device T.

The welding robot control program creation device T may acquire the position information and the posture information without using the controller CTR. The teach pendant 4 or the operation box 5 illustrated in FIGS. 1 and 2 may be used instead of the controller CTR.

In addition, an object other than the controller CTR may be used as an object imitating the torch 2 that can be held by the operator. For example, instead of the controller CTR, a mockup (model) imitating the shape of the torch 2 may be used. The welding robot control program creation device T acquires position information and posture information of the mockup based on an image captured by the camera, and uses these pieces of information as the position information of the welding start point S and the welding end point E and the posture information capable of specifying the posture of the torch 2 with respect to the weld line L.

As described above, a welding system 300 includes a welding robot 1 provided with a torch 2 and a welding robot control program creation device T. The welding robot control program creation device T acquires position information of a welding start point S and a welding end point E of welding performed on a workpiece Wk, and posture information capable of specifying a posture of the torch 2 with respect to a weld line L at a welding teaching point on the weld line L connecting the welding start point S and the welding end point E. The welding robot control program creation device T creates a welding robot control program for performing welding from the welding start point S to the welding end point E based on the position information and the posture information. The welding robot 1 performs welding on the workpiece Wk based on the welding robot control program. As a result, the welding robot 1 can perform the welding from the welding start point S to the welding end point E along the weld line L by an easy-to-operate teaching.

The welding robot control program creation device T includes a processing unit 101. The processing unit 101 acquires the position information of the welding start point S and the welding end point E of the welding performed on the workpiece Wk, and the posture information capable of specifying the posture of the torch 2 included in the welding robot 1 with respect to the weld line L at the welding teaching point on the weld line L connecting the welding start point S and the welding end point E. The processing unit 101 creates a welding robot control program for performing welding from the welding start point S to the welding end point E based on the position information and the posture information. As a result, the welding robot 1 can perform the welding from the welding start point S to the welding end point E along the weld line L by an easy-to-operate teaching.

In a welding robot control program creation method by the welding robot control program creation device T, the welding robot control program creation device T acquires the position information of the welding start point S and the welding end point E of the welding performed on the workpiece Wk, and the posture information capable of specifying the posture of the torch 2 included in the welding robot 1 with respect to the weld line L at the welding teaching point on the weld line L connecting the welding start point S and the welding end point E. The welding robot control program creation device T creates a welding robot control program for performing welding from the welding start point S to the welding end point E based on the position information and the posture information. As a result, the welding robot 1 can perform the welding from the welding start point S to the welding end point E along the weld line L by an easy-to-operate teaching.

A creation program for a welding robot control program causes the welding robot control program creation device T to acquire the position information of the welding start point S and the welding end point E of the welding performed on the workpiece Wk, and the posture information capable of specifying the posture of the torch 2 included in the welding robot 1 with respect to the weld line L at the welding teaching point on the weld line L connecting the welding start point S and the welding end point E. The creation program for a welding robot control program causes the welding robot control program creation device T to create a welding robot control program for performing welding from the welding start point S to the welding end point E based on the position information and the posture information. As a result, the welding robot 1 can perform the welding from the welding start point S to the welding end point E along the weld line L by an easy-to-operate teaching.

The welding system 300 further includes a controller CTR that can be held by an operator. The welding robot control program creation device T acquires, as the posture information, controller posture information, which is information indicating a posture of the controller CTR facing the welding teaching point. As a result, the operator can easily perform teaching of operation of the torch 2 by utilizing the posture of the controller CTR.

The controller CTR may be integrated with the welding robot control program creation device T. As a result, the controller operated by a user can create a welding robot control program.

The controller CTR has a front end portion having the same shape as the torch 2. As a result, the operator can intuitively designate the welding teaching point through which the torch 2 of the welding robot 1 passes while holding the controller CTR.

The welding teaching point on the weld line L includes at least one intermediate point M. As a result, the operator can flexibly designate an operation of welding by the welding robot 1 three-dimensionally moving the torch 2 at the time of actual welding.

The welding robot control program creation device T creates a control program of the welding robot 1 for performing, in a posture fixed section in which the posture of the torch 2 is fixed in the weld line L, welding along the weld line L up to an end point of the posture fixed section while maintaining a posture of the torch 2 with respect to the weld line L at a start point of the posture fixed section. As a result, even when the postures of the controller and the torch are changed at the time of teaching, the welding robot 1 can perform the welding while the torch maintains a constant posture with respect to the weld line, and the quality of welding is stabilized.

The welding robot control program creation device T creates a control program of the welding robot for performing, in a posture non-fixed section in which the posture of the torch 2 is not fixed in the weld line L, welding along the weld line such that the posture of the torch 2 with respect to the weld line L follows a posture of the torch 2 specified based on the posture information. As a result, the welding robot control program creation device T allows the operator to flexibly teach the movement of the torch even in a posture non-fixed section in which the posture of the torch cannot be made constant in the first place.

Although the welding system, the welding robot control program creation device, the welding robot control program creation method, and the creation program for a welding robot control program according to the present disclosure have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the embodiments described above may be combined freely within a range not departing from the spirit of the invention.

The present application is based on a Japanese patent application (Japanese Patent Application No. 2020-101188) filed on Jun. 10, 2020, the content of which is incorporated herein by reference.

INDUSTRIAL APPLICABILITY

The present disclosure is useful as a welding system, a welding robot control program creation device, a welding robot control program creation method, and a creation program for a welding robot control program, which perform welding from a welding start point to a welding end point along a weld line by an easy-to-operate teaching.

REFERENCE SIGNS LIST

1: welding robot
2: torch
3: robot controller
4: teach pendant
5: operation box
11: robot arm
12: end effector
100: welding robot system
101: processing unit
102: storage unit
1021: creation program of welding robot control program
103: input unit
104: display unit
200: welding robot control program creation system
300: welding system
CTR: controller
HMD: head mounted display
IR: base station
L: weld line
M: intermediate point
OBJ: object
P1: first pane
P2: second pane P3: third pane
S: welding start point
E: welding end point
T: welding robot control program creation device
W: window
Wk: workpiece

The invention claimed is:

1. A welding system comprising:
a welding robot provided with a torch; and
a welding robot control program creation device,
wherein the welding robot control program creation device is configured to
acquire position information of a welding start point and a welding end point of a weld line on a workpiece, and posture information capable of specifying a posture of the torch with respect to the weld line at a welding teaching point on the weld line, and
create a welding robot control program for performing welding from the welding start point to the welding end point based on the position information and the posture information,
wherein the welding robot is configured to perform welding on the workpiece based on the welding robot control program, and
wherein the welding robot control program creation device is configured to create the welding robot control program to include a posture fixed section in which the posture of the torch is fixed in a three-dimensional space with respect to the weld line during welding from a start point of the posture fixed section to an end point of the posture fixed section.

2. The welding system according to claim 1, further comprising:
a controller that is configured to be held by an operator, wherein
the welding robot control program creation device is further configured to acquire controller posture information as the posture information, the controller posture information being information indicating a posture of the controller toward the welding teaching point.

3. The welding system according to claim 2, wherein
the controller is integrated with the welding robot control program creation device.

4. The welding system according to claim 2, wherein
the controller has a front end portion having the same shape as the torch.

5. The welding system according to claim 1, wherein
the welding teaching point on the weld line includes at least one intermediate point.

6. The welding system according to claim 1, wherein
the welding robot control program creation device is configured to create the welding robot control program to include a posture non-fixed section in which the posture of the torch is not fixed in the three-dimensional space with respect to the weld line during welding, whereby the posture of the torch with respect to the weld line follows the posture of the torch specified based on the posture information in the posture non-fixed section.

7. A welding robot control program creation device comprising:
a memory; and
a processing unit, wherein
the processing unit is configured to
acquire position information of a welding start point and a welding end point of a weld line on a workpiece, and posture information capable of specifying a posture of a torch of a welding robot with respect to the weld line at a welding teaching point on the weld line, and
create a welding robot control program for performing welding from the welding start point to the welding end point based on the position information and the posture information,
wherein the processing unit is configured to create the welding robot control program to include a posture fixed section in which the posture of the torch is fixed in a three-dimensional space with respect to the weld line during welding from a start point of the posture fixed section to an end point of the posture fixed section.

8. A welding robot control program creation method by a welding robot control program creation device, the welding robot control program creation method comprising:
acquiring position information of a welding start point and a welding end point of a weld line on a workpiece, and posture information capable of specifying a posture of a torch of a welding robot with respect to the weld line at a welding teaching point on the weld line, and
creating a welding robot control program of the welding robot for performing welding from the welding start point to the welding end point based on the position information and the posture information,
wherein the creating of the welding robot control program includes creating the welding robot control program to include a posture fixed section in which the posture of the torch is fixed in a three-dimensional space with respect to the weld line during welding from a start point of the posture fixed section to an end point of the posture fixed section.

9. A non-transitory computer readable storage medium having stored thereon the welding robot control program created by the welding robot control program creation method according to claim 8.

* * * * *